UNITED STATES PATENT OFFICE.

JAMES V. Z. BLANEY AND RICHARD F. ADAMS, OF CHICAGO, ILLINOIS.

IMPROVEMENT IN REDUCING LEAD ORES AND COLLECTING PRECIOUS METALS.

Specification forming part of Letters Patent No. 134,457, dated December 31, 1872.

*To all whom it may concern:*

Be it known that we, JAS. V. Z. BLANEY and RICHD. F. ADAMS, both of Chicago, Cook county, Illinois, have invented an Improvement in Method of Smelting Ores, of which the following is a specification:

The object of our invention is to work the galena or lead ores which contain gold or silver, &c., and the pyrites or sulphurets of copper or iron which may or may not contain the precious metals, or the baser metals, such as copper, &c., in a cheap and economical manner, so as to obtain the several metals—gold, silver, copper, or other metals in the lead regulus—from which condition it is easily separated by processes well known to the art.

To this end our invention consists in a process wherein the galena and its admixtures, together with the pyrites which have been previously roasted to reduce them to the state of a sponge or oxide, are fused by the presence of an alkali, salt of an alkali, or alkaline earth with carbon, which will take up any remaining sulphur, so that the lead contained carries down with it the precious and base metals.

The following are approximate proportions of materials to be used for the reduction of argentiferous galena and auriferous pyritous ores: To five hundred pounds of galena and five hundred pounds of desulphurized or roasted pyrites add from fifty to seventy-five pounds of coke or charcoal for carbon, and from three hundred to five hundred pounds of an alkali, such as soda-ash, or an alkaline earth, such as limestone or quicklime, or a mixture thereof, as soda-ash, one part, to lime, two parts.

Approximate proportions of materials to be used for the reduction of galena and other ores not containing any considerable quantity of iron: To one thousand pounds of ore add from two hundred to two hundred and fifty pounds of peroxide or other compounds of iron, and from fifty to seventy-five pounds of coke or charcoal for carbon, and from three hundred to five hundred pounds of an alkali, such as soda-ash, or an alkaline earth, as limestone or quicklime, or a mixture thereof, as soda-ash, one part, to lime, two parts.

We do not limit ourselves to these proportions, as they may be and are to be varied for the different ores to be reduced. In roasting pyritous ores the greater proportion of the sulphur is driven off, and oxygen enters into combination; hence a large proportion of the sulphide of iron is converted into magnetic or peroxide of iron, furnishing the oxides of iron prescribed for the flux.

In smelting the ores containing little or no oxides of iron the oxides of iron must be added to the flux. In the smelting of the ores in the furnace the oxides of iron, whether furnished by the roasted pyrites or not, together with the carbon and the alkali, or alkaline earth, or mixture thereof, reduce any sulphides of the various metals present in the ores, such as lead, gold, silver, copper, &c., to the metallic state, the lead furnished by the galena acting as a medium to collect and carry down the gold, silver, and other metals in both ores, whether they exist in the ores as sulphides or in the metallic state. The carbon removes the oxygen from the iron oxides, leaving metallic iron in a minutely-divided state to remove the sulphur. The soda-ash or soda-lime mixture doubtless removes some sulphur also, and combines with the silica, alumina, and other substances of the gangue, with any remaining iron that there may be, to form a fusible slag, permitting the reduced metals to settle to the bottom.

We are aware that the alkalies and alkaline earths have been and are in general use in the reduction of galena and other ores; therefore we do not claim their special use as our invention, but only incidentally in connection with carbon and the oxides of iron, whether native or artificial, as furnished by the pyrites after roasting.

We claim as our invention, and desire to secure by Letters Patent from the United States, the process herein described, viz:

1. The reduction of galena containing gold, silver, &c., together with pyrites which may or may not contain precious or base metals, in the presence of an alkali, salt of an alkali, or alkaline earth and carbon, substantially as described.

2. The process of simultaneously reducing galena containing gold, silver, &c., and pyritous ores, (after roasting,) with carbon and in the presence of an alkali, salt of an alkali, or an alkaline earth, whereby the roasted pyrites furnish the oxides of iron necessary to reduce, and the galena the lead necessary to carry down, the precious and base metals in both ores, substantially as specified.

JAS. V. Z. BLANEY.
RICHARD F. ADAMS.

Witnesses:
J. M. ADSIT, Jr.,
A. J. McDUFFEE.